UNITED STATES PATENT OFFICE 2,210,316

METHOD OF REACTING OLEFINS WITH SULPHURIC ACID

Robert R. Dreisbach, Midland, Mich., assignor to The Dow Chemical Company, Midland, Mich., a corporation of Michigan No Drawing. Application July 6, 1937, Serial No. 152,148

8 Claims. (Cl. 260—460)

This invention concerns an improved method of reacting olefins with sulphuric acid.

It is well known that an olefin may be reacted with sulphuric acid to form an alkyl sulphate, which may be hydrolyzed to produce an alcohol corresponding to the olefin and regenerate the acid. It is also known that the olefins may be obtained from the gas produced by cracking various hydrocarbon materials such as mineral oil, kerosene, coal-tar distillate, etc., at elevated temperatures. The gas obtained by such cracking operation comprises a multiplicity of olefins, e. g. ethylene, propylene, butylene, amylenes, hexenes, etc., and also hydrogen and saturated hydrocarbons such as ethane, propane, etc. Such gas is hereinafter referred to as "cracked-oil gas."

A number of difficulties are commonly encountered when attempt is made to manufacture ethyl or isopropyl alcohol by reacting the corresponding olefins in cracked-oil gas with sulphuric acid and hydrolyzing the reacted mixture. For instance, the reaction of ethylene with sulphuric acid is normally sluggish, whereas the higher olefins, although more reactive with sulphuric acid, are susceptible to polymerization when in the presence of said acid, the tendency toward polymerization being greater as the molecular weight of the olefin increases. Accordingly, when cracked-oil gas is passed directly into sulphuric acid under conditions which will permit reaction between the acid and propylene, the higher olefins present in the gas also react in part with the acid (forming a mixture of esters from which a mixture of alcohols is obtained on subsequent hydrolysis of the product) and are polymerized in part with formation of undesirable tars and high boiling oils. In order to avoid such difficulties it has been proposed to pass the cracked-oil gas through a series of reactors, in the first of which the gas is to be contacted with sulphuric acid of such concentration and at such temperature that only the highest and most readily polymerizable olefins will be absorbed and removed from the gas; in the second of which the gas is to be contacted with sulphuric acid under conditions such that olefins of somewhat lower molecular weight are absorbed; etc. Such step-wise method possesses the disadvantages of requiring complicated and expensive equipment and careful control of a number of chemical reactors operating simultaneously under different conditions. Furthermore, ethylene, the last of the olefins to be removed, reacts so sluggishly with sulphuric acid that complete reaction of the same in such process is impracticable.

An object of this invention is to provide a simple economical method for reacting olefins, particularly the lower olefins present in cracked-oil gas, with sulphuric acid.

I have discovered that cupric compounds, particularly cupric sulphate, are exceptionally active catalysts for the reaction of an olefin with sulphuric acid, so that even ethylene may be reacted rapidly with sulphuric acid in the presence of such catalyst to produce ethyl esters of the acid in good yield. I have further found that the reaction of propylene with sulphuric acid may be carried out rapidly in the presence of the catalyst without appreciable loss of propylene through polymerization and, further, that such reaction between propylene and the acid may be carried out rapidly at temperatures and pressures below those at which rapid reaction occurs between ethylene and the acid. For instance, propylene reacts rapidly and ethylene slowly with concentrated sulphuric acid in the presence of the catalyst at temperatures below 20° C.; e. g. 5–20° C., and pressures below 80 pounds per square inch, gauge, e. g. 60—80 pounds per square inch. At higher temperatures and pressures, e. g. 20°–60° C. and 80 or more pounds per square inch pressure, both olefins react readily with the acid in the presence of the catalyst. Accordingly, by passing a gaseous mixture comprising ethylene and propylene into contact for a short time, e. g. 2 to 10 minutes, with concentrated sulphuric acid at a temperature below 20° C. and a pressure not exceeding about 80 pounds per square inch, the propylene may be reacted to form isopropyl esters of the acid leaving the ethylene substantially free of other olefins. The ethylene may then be contacted with the acid and catalyst for a longer time, e. g. 1 to 10 hours under otherwise similar conditions, or for any period of time at higher temperatures and pressures to obtain ethyl esters of the acid in good yield. The isopropyl esters and the ethyl esters may then be hydrolyzed separately to obtain the corresponding alcohols or ethers as substantially pure compounds. Also, the initial gas mixture comprising ethylene and propylene may be contacted with concentrated sulphuric acid and the catalyst at temperatures above 20° C., and pressures higher than 80 pounds per square inch to obtain a mixture of ethyl and isopropyl esters of the acid which may then be hydrolyzed to obtain a mixture of the corresponding alcohols or ethers.

The invention, then, consists in the method hereinafter fully described and particularly pointed out in the claims.

In manufacturing ethyl and isopropyl alcohols or ethers from cracked-oil gas according to the invention, the gas is preferably first treated to remove olefins higher than propylene. Such treatment may be carried out in a variety of ways, e. g. by condensing the gas under pressure and fractionally distilling at low temperature to separate the hydrocarbons containing up to three carbon atoms from higher hydrocarbons, or by scrubbing the gas with sulphuric acid of such temperature and concentration that butylene and higher olefins are removed leaving ethylene and propylene in the residual gas. In practice, such higher olefins are preferably removed by treating the crude gas with sufficient chlorine to react with the butylene and higher olefins, but not the ethylene and propylene, and condensing the resultant olefin chlorides which are collected as valuable by-products from the process.

The gas remaining after such preliminary treatment comprises ethylene and propylene, but is substantially free of higher olefins. By passing this gas through concentrated sulphuric acid containing a cupric compound at such rate that the gas is contacted with the acid for at least 5 minutes, while maintaining the mixture at a temperature above 15° C., preferably between 15° and 25° C., and at a pressure above 80 pounds per square inch, preferably between 100 and 200 pounds per square inch, a mixture of ethyl and isopropyl esters of the acid may be obtained. On the other hand, the propylene in the gas may be reacted selectively with sulphuric acid by passing the gas into sulphuric acid alone under conditions otherwise similar to those just described, or by passing the gas through concentrated sulphuric acid containing a cupric compound at such rate that the gas is contacted with the acid for not more than .10 minutes, while maintaining the mixture at a temperature below 20° C., e. g. between 5° and 20° C., and at a pressure not exceeding 80 pounds, preferably between 60 and 80 pounds per square inch. By either of the two last mentioned procedures, isopropyl esters of sulphuric acid are obtained, leaving the ethylene largely in the residual gas. The latter may then be contacted at temperatures above 20° C., preferably between 40° and 60° C., and pressures above 80 pounds per square inch, preferably between 100 and 200 pounds per square inch, with sulphuric acid containing a cupric compound to obtain ethyl esters of sulphuric acid, e. g. ethyl sulphuric acid and diethyl sulphate.

Sulphuric acid of concentration greater than 90 per cent by weight, preferably between 93 and 100 per cent, is employed in such reactions. The cupric compound employed as catalyst for the reactions is preferably cupric sulphate, but other cupric compounds such as cupric oxide, cupric chloride, cupric acetate, etc., may be used. When a cupric compound other than cupric sulphate is added to the reaction mixture it is believed that cupric sulphate is formed, hence, the reaction probably is carried out in the presence of cupric sulphate regardless of the cupric compound initially employed. The catalyst may be employed in any desired proportion, but in practice I usually employ between 0.5 and 2 parts by weight of substantially anhydrous cupric sulphate per 100 parts of acid.

The procedure and equipment employed in carrying out the reaction may be varied widely. For instance, the reaction may be carried out under the conditions of temperature, pressure, etc., hereinbefore specified, by passing the gas upwardly through a packed reaction tower counter-current to a downward trickle of the reaction liquor; by passing the gas and reaction liquor continuously in concurrent flow through a horizontal or inclined tubular autoclave; by passing the gas under pressure into or through a rotating autoclave, etc. Regardless of the particular procedure and equipment used, the reaction mixture is preferably stirred or otherwise agitated during the reaction so as to provide thorough scrubbing of the gas by the liquor.

Passage of gas into contact with the acid liquor is continued until the rate of olefin absorption becomes too slow to warrant further operation. It is usually practicable to continue the reaction until more than one mol of ethylene and/or propylene has been absorbed per mol of sulphuric acid.

The following examples illustrate a number of ways in which the principle of the invention has been applied, but are not to be construed as limiting the invention:

*Example 1*

Cracked-oil gas, which had been prechlorinated sufficiently to remove butylene and higher olefins therefrom and contained 6.4 per cent by volume of propylene and 42.2 per cent of ethylene, was passed into a rotating autoclave containing 400 grams of 100 per cent sulphuric acid until the pressure in the autoclave was approximately 80 pounds per square inch. The autoclave was then closed and rotated for about 3 minutes while maintaining the charge at a temperature of 10°–15° C., after which the residual gas was withdrawn into a suitable receiver, the autoclave was recharged with fresh gas, and again rotated. Operation in such manner was continued until a total of 40.8 cubic feet of gas had been charged into the autoclave and 38 cubic feet withdrawn, the gas volumes just stated being the volumes at 0° C. and 760 millimeters pressure. The residual gas contained 42.2 per cent of ethylene and only 2.7 per cent of propylene. The acid liquor was poured into 160 grams of ice water after which the alcohol product was distilled from the mixture. There was obtained 213 grams of aqueous isopropyl alcohol containing approximately 57.6 grams of the pure alcohol. 23.2 cubic feet of the residual gas (expressed in terms of volume at 0° C. and 760 millimeters pressure) was then passed into an autoclave containing 400 grams of 100 per cent sulphuric acid and 8 grams of anhydrous cupric sulphate as described above, except that the mixture was maintained at a temperature of about 60° C. and a pressure of about 95 pounds per square inch during the reaction. The gas remaining after the treatment was free of propylene and contained only 34 per cent by volume of ethylene. The acid liquor was hydrolyzed as described above, whereby 212 grams of aqueous alcohol, containing approximately 99 grams of ethyl and isopropyl alcohols, was obtained.

*Example 2*

Cracked-oil gas containing 10.4 per cent by volume of propylene and 41.2 per cent of ethylene was treated with a mixture of 400 grams of 100 per cent sulphuric acid and 4 grams of cupric sulphate at a temperature of 10°–15° C. and a pressure of about 80 pounds per square inch.

gauge. The procedure in carrying out the treatment was similar to that described in Example 1. The gas recovered from the treatment contained 4.4 per cent of propylene and 42.6 per cent of ethylene. Substantially pure isopropyl alcohol was obtained by hydrolysis of the reaction liquor. The recovered gas was treated at a temperature of 60° C., and a pressure of 80 pounds per square inch with a mixture of 400 grams of 100 per cent sulphuric acid and 4 grams of cupric sulphate. The gas recovered from this treatment was free of propylene and contained only 23 per cent of ethylene. A mixture of ethyl and isopropyl alcohols was obtained by hydrolysis of the reaction liquor.

*Example 3*

44.5 cubic feet of cracked-oil gas containing 9.2 per cent by volume of propylene and 41.4 per cent of ethylene, but free of higher olefins, was treated at a temperature of 20°-25° C. and a pressure of 100 pounds per square inch with a mixture of 400 grams of 100 per cent sulphuric acid and 8 grams of anhydrous cupric sulphate, the procedure followed in the treatment being similar to that described in Example 1. There was recovered 38 cubic feet of unreacted gas containing only 1.5 per cent of propylene and 40.6 per cent of ethylene. By hydrolyzing the reaction liquor as in Example 1, there was obtained 224 grams of aqueous alcohol containing 145 grams of anhydrous alcohol. The alcohol product was largely isopropyl alcohol but contained a minor proportion of ethyl alcohol. Traces of the corresponding ethers were also obtained.

*Example 4*

Cracked-oil gas, containing 14.3 per cent by volume of ethylene, but which had been freed of higher olefins, was reacted at a temperature of 60° C. and a pressure of 80 pounds per square inch with anhydrous sulphuric acid containing 2 per cent by weight of anhydrous cupric sulphate, the procedure being similar to that described in Example 1. The gas recovered from the treatment contained only 3 per cent of ethylene. Pure ethyl alcohol was obtained by hydrolysis of the acid liquor.

*Example 5*

Ethylene was reacted as in Example 4 with anhydrous sulphuric acid containing about 2 per cent by weight of anhydrous cupric sulphate, approximately 1.25 mols of ethylene being absorbed per mol of sulphuric acid employed. 780 grams of the reacted mixture was poured onto 75 grams of ice and the resultant mixture was steam distilled, with introduction of live steam, until the distilling vapors were at a temperature of 80° C. Prior to and during this distillation approximately 1.8 mols of water was added per mol of ethylene absorbed in the reaction mixture. The steam distillate was then fractionally distilled to separate the ether and alcohol products. The residual liquor from the above mentioned steam distillation was further distilled with steam until the vapors were at a temperature of 100° C. and this steam distillate was then fractionally distilled to separate the ether and alcohol products. There was recovered a total of 195.7 grams (2.64 mols) of diethyl ether and 46.5 grams (1.0 mol) of ethyl alcohol in aqueous solution, the yields of the ether and alcohol being 71.2 per cent and 13.3 per cent of theoretical, respectively, based on the ethylene absorbed in the acid.

Although the invention is directed particularly to the treatment of cracked-oil gas fractions with sulphuric acid to form alkyl sulphates, e. g. ethyl and isopropyl esters of sulphuric acid, it is equally applicable in reacting a pure olefin with the acid. It may be applied advantageously in reacting ethylene, propylene, or a higher olefin such as butylene, isobutylene, amylene, or isoamylene, etc. with sulphuric acid, since the presence of a cupric compound accelerates the rate of any such reaction without promoting polymerization of the olefin.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:

1. The method which comprises reacting an olefin with sulphuric acid in the presence of a cupric compound as catalyst to form an alkyl ester of sulphuric acid.

2. The method which comprises reacting an olefin with sulphuric acid in the presence of cupric sulphate as catalyst to form an alkyl ester of sulphuric acid.

3. The method which comprises reacting ethylene with sulphuric acid in the presence of cupric sulphate as catalyst to form an ethyl ester of sulphuric acid.

4. The method which comprises reacting propylene with sulphuric acid in the presence of cupric sulphate as catalyst to form an alkyl ester of sulphuric acid.

5. The method which comprises reacting ethylene with concentrated sulphuric acid in the presence of cupric sulphate as catalyst at a temperature above 20° C. and a pressure above 80 pounds per square inch.

6. The method which comprises reacting ethylene with concentrated sulphuric acid in the presence of cupric sulphate as catalyst at a temperature between 40° and 60° C. and a pressure above 80 pounds per square inch.

7. The method which comprises reacting propylene with concentrated sulphuric acid in the presence of cupric sulphate as catalyst at a temperature not exceeding 20° C. and a pressure between 60 and 80 pounds per square inch.

8. The method which comprises passing a hydrocarbon gas mixture comprising ethylene and propylene into contact with a mixture of concentrated sulphuric acid and cupric sulphate, while maintaining the reaction mixture at a temperature not exceeding 20° C. and a pressure not exceeding 80 pounds per square inch, whereby the propylene is selectively and catalytically reacted with the acid and residual gas comprising ethylene but relatively free of propylene is obtained.

ROBERT R. DREISBACH.